United States Patent
Montillo et al.

(10) Patent No.: US 6,571,006 B1
(45) Date of Patent: May 27, 2003

(54) METHODS AND APPARATUSES FOR MEASURING AN EXTENT OF A GROUP OF OBJECTS WITHIN AN IMAGE

(75) Inventors: Albert A. Montillo, Watertown, MA (US); Ivan A. Bachelder, Newton, MA (US); Cyril C. Marrion, Jr., Acton, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 09/201,412

(22) Filed: Nov. 30, 1998

(51) Int. Cl.⁷ .................................................. G06K 9/00
(52) U.S. Cl. ........................ 382/147; 382/146; 382/151; 382/199
(58) Field of Search ................................ 382/146, 147, 382/150, 168, 173, 199, 218, 151; 356/237.1, 237.5, 601; 378/58

(56) References Cited

U.S. PATENT DOCUMENTS

| | | | |
|---|---|---|---|
| 4,441,205 A | * 4/1984 | Berkin et al. | 382/151 |
| 4,696,047 A | * 9/1987 | Christian et al. | 382/126 |
| 4,847,911 A | * 7/1989 | Morimoto et al. | 382/146 |
| 4,862,510 A | * 8/1989 | Duncan et al. | 250/559.05 |
| 4,875,779 A | * 10/1989 | Luebbe et al. | 356/394 |
| 4,980,971 A | 1/1991 | Bartschat et al. | |
| 5,012,502 A | * 4/1991 | Battin et al. | 378/58 |
| 5,023,916 A | * 6/1991 | Breu | 382/150 |
| 5,113,565 A | 5/1992 | Cipolla et al. | |
| 5,185,811 A | * 2/1993 | Beers et al. | 382/288 |
| 5,268,999 A | 12/1993 | Yokoyama | |
| 5,343,028 A | 8/1994 | Figarella et al. | |
| 5,371,690 A | * 12/1994 | Engel et al. | 382/151 |
| 5,495,424 A | * 2/1996 | Tokura | 702/82 |
| 5,495,537 A | 2/1996 | Bedrosian et al. | |
| 5,497,451 A | 3/1996 | Holmes | |
| 5,545,887 A | 8/1996 | Smith et al. | |
| 5,627,912 A | 5/1997 | Matsumoto | |
| 5,729,346 A | * 3/1998 | Joo | 356/394 |
| 5,760,893 A | * 6/1998 | Raymond | 356/394 |
| 5,805,722 A | * 9/1998 | Cullen et al. | 382/146 |
| 6,130,959 A | * 10/2000 | Li | 382/150 |

OTHER PUBLICATIONS

Cognex Corporation, "Chapter 4 Caliper Tool," *Cognex 3000/4000/5000 Programmable Vision Engines, Vision Tools*, 1996, pp. 207–231, Release 7.4 590–0136, Natick, MA, USA.

Cognex Corporation, "Chapter 8 Large–Leaded Device Inspection," *Cognex 4000/5000 SMD Placement Guidance Package User's Manual*, 1996, pp. 311–324, Release 3.2 590–1039, Natick, MA, USA.

Medina–Mora, et al., "An Incremental Programming Environment," *IEEE Transactions on Software Engineering*, Sep. 1981, pp. 472–482, vol. SE–7, No. 5, USA.

Ullman, Shimon, "Aligning pictorial descriptions: An approach to object recognition, I: Approaches to Object Recognition," reprinted from *Cognition*, Aug. 1989, pp. 201–214, vol. 32, No. 3, Cambridge, MA, USA.

* cited by examiner

*Primary Examiner*—Timothy M. Johnson
*Assistant Examiner*—Sheela Chawan
(74) *Attorney, Agent, or Firm*—Tracy Calabressi; Russ Weinzimmer

(57) ABSTRACT

Methods are disclosed that measure the extent of a group of objects within a digital image by comparing signature, representative of the relationship of the objects to one another, against instances of a measured signature at varying positions within the image. The position(s) where the signature(s) vary by a predetermined comparison criterion indicates the extent of the group of objects. It is disclosed that the comparison to a reference signature allows proper identification of measured signatures despite noise in the digital image. A preferred embodiment uses the CALIPER TOOL to generate signatures of edges, where the window of the CALIPER TOOL has a projection axis substantially parallel to the extent being measured. A preferred application is desired wherein the method measure the length of leads in a lead set.

11 Claims, 11 Drawing Sheets

METHODS AND APPARATUSES FOR MEASURING AN EXTENT OF A GROUP OF OBJECTS WITHIN AN IMAGE

FIELD OF THE INVENTION

This invention relates to machine vision, and particularly to dimensional measurement within a digital image.

BACKGROUND

Many machine vision systems use a model for inspecting or recognizing objects within images. Often, such models must accurately reflect the physical dimensions of the objects so that the position of the objects can be determined in an image, and so that precise tolerance checking and defect detection can be performed. For example, a vision-based automatic surface mounter (SMD) machine employs a model that includes the length of leads of leaded devices to accurately inspect and place the leaded devices on a printed circuit board (PCB).

FIG. 1A illustrates a bottom view and a side view of a gullwing-leaded device 100, not drawn to scale, where a leaded device is an electronic device that has a device body 110 and leads 102. The leads 102 are metal contacts on the exterior surface of the device body 110 that are connected to an integrated circuit (not shown) within the device body 110. Leaded devices include surface-mount devices and through-hole devices, for example. The leads 102 of the surface-mount devices are placed by the SMD machine, such that the leads 102 substantially contacts pads on a PCB (not shown) within positional tolerances.

The length 104 of a gullwing lead 102 is the distance between the base 108 and the tip 106 of the lead 102. The positions of bases 108 and tips 106 in an image are often determined by identifying edges corresponding to the bases 108 and the tips 106. With varying degrees of success, the edges are found using methods known in the art. The edges can also be found by using CALIPER TOOL sold by Cognex Corporation. The CALIPER TOOL is a machine-vision tool illustrated with reference to FIG. 2 and further described in Vision Tools, Chapter 4, CALIPER TOOL, Cognex Corporation, Version 7.4, 1996, pp. 208–231, incorporated herein by reference.

The CALIPER TOOL finds edges, such as 206 and 208, within an area of an image 200 enclosed by a window 204. More particularly, the CALIPER TOOL accumulates edges along a projection axis, p, of the window 204. An edge, as used herein, consists of a plurality of connected edge elements or edge pixels that correspond to underlying image pixels. An image can be represented as an array of image pixels, where an image pixel is a picture element characterized by a grey value. Each edge can be one or more image pixels wide.

The intensity of pixels within the window 204 along p are projected (i.e., added), thereby generating a one-dimensional image 210. The projection axis, p, is perpendicular to l, and together l, p, and w, which is the width of the window 204, define the window 204. Linear projection collapses an image by summing the grey values of the pixels in the direction of the projection. The summation tends to amplify edges in the same direction as p. After projection, an edge filter is applied to the one-dimensional image 210 to further enhance edge information and to smooth the one-dimensional image 210. The one-dimensional image is illustrated graphically as histogram 212. The edge 206 is represented in the histogram 212 as a falling ramp 216, and the edge 208 is represented in the histogram as a rising ramp 218. Each edge 206 and 208 has a polarity (i.e., direction), where edge 206 has a light-to-dark polarity and edge 208 has a dark-to-light polarity. In this example, both edges 206 and 208 have the same contrast, where contrast is the difference in grey levels on opposite sides of an edge.

The edges corresponding to the bases 108 and the tips 106 of the leads 102 are located using a window of the CALIPER TOOL. To find the edges corresponding to the bases 108 and the tips 106, optimally projection is performed along a direction of a line tangent to the edges of the bases 108 and the tips 106. Accordingly, the window is positioned such that its projection axis, p, is as close as possible substantially parallel to a line tangent to the lead bases 108 and the lead tips 106 and normal to a lead axis, T–T', of the leads 102. The degree p can be of offset from parallel depends upon each application and varies widely as is known in the art. The length, l, extends across each end of the leads 102. Alternatively, two windows 112 and 114 each enclosing one end of each lead can locate each base 108 and tip 106, where p of the two windows is also substantially parallel to a line tangent to the bases 108 and tips 106 and substantially normal to T–T'.

A problem with these methods is the lack of integrity of the generated edge information. Other structures in the image generate extraneous edges, such as feature 302 on the device body 300 and the silhouette of the device body 304, not drawn to scale, illustrated in gullwing-leaded device of FIG. 3. The extraneous edges confuse identification of the edges of the lead base 308 and lead tip 306.

A further drawback of this method is that back-lit images do not have edges corresponding to both the lead base 308 and the lead tip 306. FIG. 4B illustrates back-lit imagery, where the light 450 originates from a light source 458 located behind the object 452 and is directed toward the imaging device 456 so that the object 452 and the leads 454 appear as a silhouette.

Another drawback of this method is that it is not easily extended to deal with varying lead lengths.

Alternatively, the length of leads is determined by binarizing the image of the leaded device. Binarizing an image is a technique where a threshold is chosen to segment the image into foreground objects and the background. Typically, one intensity, such as white, denotes the leads, and the other intensity, such as black, denotes the image background. Once binarized, the length of the white object in the image is determined easily using known methods, such as a connected component analysis.

One of the short falls of the binarization technique is the inability of a single threshold to segment the entire lead from the background. Typically, the leads have specularly reflecting surfaces that frustrate identifying a threshold within a front-lit image of a leaded device. FIG. 4A illustrates a front-lit system, where a light source 408 directs light 410 towards a bottom of a leaded device 402 and leads 404, and the light reflects off the leaded device 402 and the leads 404 back to the imaging device 406 which collects the light. The metal leads 404 specularly reflect the light 410 of the front-lit system. Further, the shape of the leads 404 causes reflections in some portions of the leads 404 to be stronger than other reflections. An example of the varying intensities imaged from a portion of a gullwing-leaded device is illustrated in FIG. 3.

Back-lit images of the leaded devices do not exhibit specular reflections because only the silhouette of the device is imaged. In a back-lit image, the leads and the device body have substantially the same grey scale value, and, therefore, no threshold exists that segments the entire lead relative to the body and background. Consequently, the base of the leads cannot be identified in the image. Thus, the binarization method is not an optimal solution.

In addition to leads, other parallel objects that are in close proximity to each other often frustrate prior methods for measuring length of the parallel objects.

SUMMARY

Methods and apparatuses are disclosed for measuring an extent of a group of objects within a digital image by comparing a reference signature, representative of at least one relationship of the objects to one another, against instances of a measured signature representing various positions within the image. The position(s) where the signature (s) vary by more than a predetermined comparison criteria are used to calculate the extent of the group of objects. More generally, the comparison criterion indicates when the measured signature no longer represents the same group of objects.

The measured signature is obtained by placing a window having a projection axis substantially parallel to the extent of the group of objects, where the window extends across at least a portion of the group of objects. The image within the window is projected along the projection axis of the window to generate a measured signature that is then compared against the reference signature.

A measured signature is generated at a plurality of window positions along the extent of the group of objects. The measured signature is generated until the measured signature differs from the reference signature by more than the comparison criteria. When the measured signature differs by more than the comparison criteria, the group of objects is considered no longer within the window. Therefore, the group of objects has an extent that is no greater than the position of the corresponding measured signature. Consequently, the position of the measured signature where the measured signature differs by the comparison criteria from the reference signature is used to calculate the extent of the group of objects.

In one embodiment, the extent is approximately the difference between two positions of the measured signature just prior to the measured signatures that indicate the objects are no longer within the window. In this embodiment, the image is searched by moving the windows outward from one center point until both ends of the group of objects are found.

In one embodiment, the reference signature is a signature of the group of objects near one of its ends, but not including the ends. Therefore, the extent of the group is approximately the difference between the window position of the reference signature and the window position of the measured signature just prior to the measured signature that indicates the group of objects is no longer within the window.

In one embodiment, the measurement of the extent of the objects is further refined by examining at a finer increment the space between the two consecutive positions of the measured signatures that indicated the termination of the group of objects. Specifically, multiple measured signatures are generated between the two consecutive positions of the window. Therefore, more precisely determining the position of the termination of the group of objects.

In a preferred embodiment, the signatures are generated using a window of the CALIPER TOOL, and the signatures are related to edges of the group of objects. In a preferred embodiment, the measured signature is a collection of the edges within the window, and the reference signature has slots derived from edges. Each slot of the reference signature represents an edge position plus or minus a positional tolerance, where each slot is "filled" by a correspondingly positioned edge of the measured signature.

In further aspects, the reference signature is modified to accommodate expected gradual movement of the objects from their original position in the reference signature.

A preferred application is measuring the length of leads in a leaded device, but other non-parallel object applications are also disclosed.

Because the reference signature is predetermined, the comparison of positions in the image to the reference signature accommodates a wide degree of noise and other randomness within the image without altering the accuracy of the measurement of the extent of the group of objects.

The invention recognizes that focusing only on position of the edges within the measured signature also provides latitude for noise, while still properly determining the extent of the objects. Further, one advantage of the invention is that it can measure objects that are in close proximity to each other.

The method and apparatuses according to the invention overcome various problems with prior art measuring methods, such as problems resulting from extraneous edges, problems resulting from varying lengths of groups of objects, and problems resulting from difficulties in segmenting the objects from the remainder of the image, for instance.

BRIEF DESCRIPTION OF THE DRAWINGS

The invention will be more fully understood from the following detailed description, in conjunction with the accompanying figures, wherein.

DETAILED DESCRIPTION OF THE DRAWINGS

Figure 5:
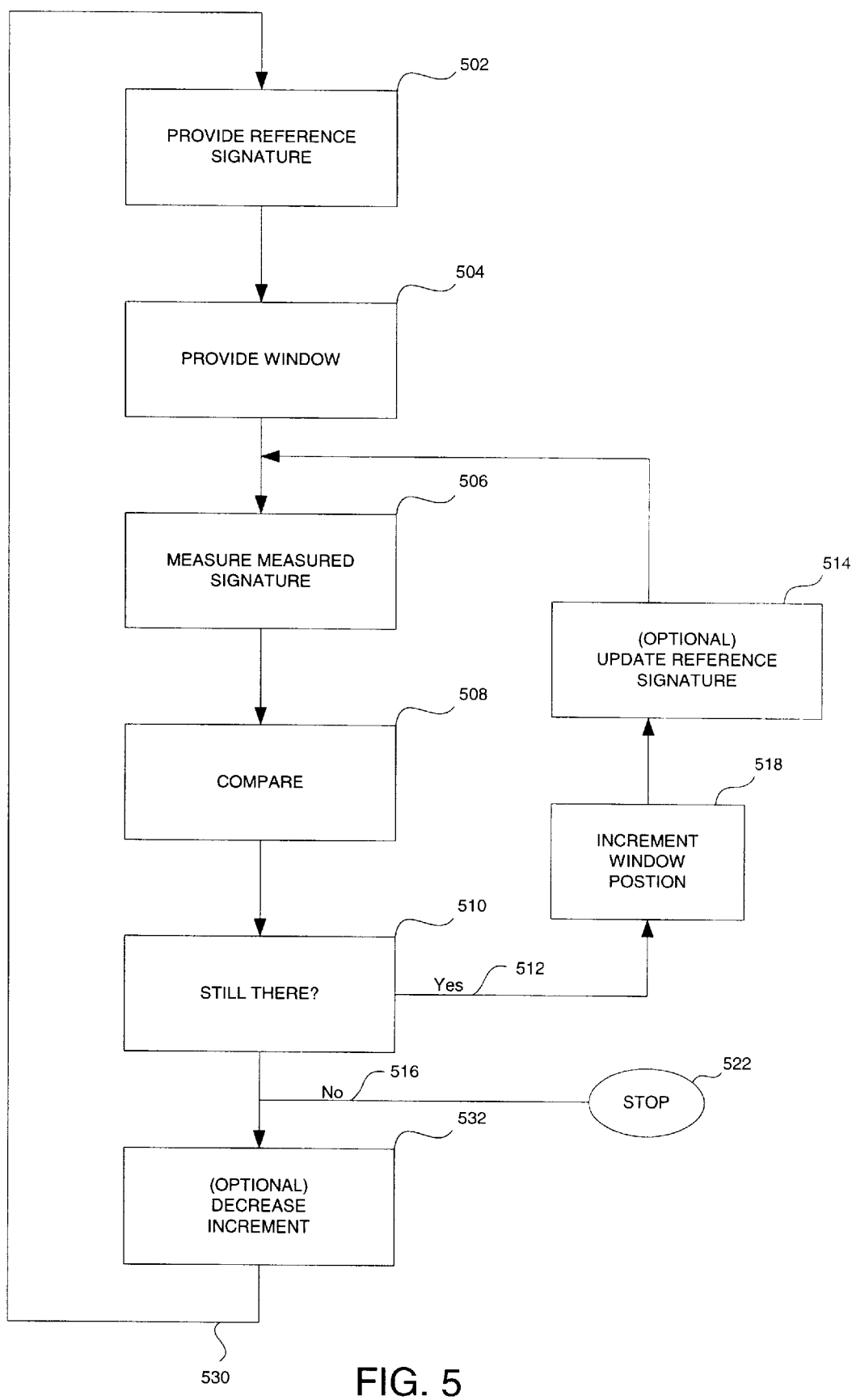
FIG. 5 is a flow chart of embodiments of the method to measure the extent of a group of objects.

Methods and apparatuses are disclosed for measuring an extent of a group of objects within an image. FIG. 5 is a flowchart of embodiments of the method of the invention, where steps of the method are denoted in the detailed description in parenthesis. The methods detect the presence or absence of a group of objects at positions within a digital image. The point of transition between the presence and the absence of the group of objects is used to calculate the extent of the group of objects.

Figure 1B:
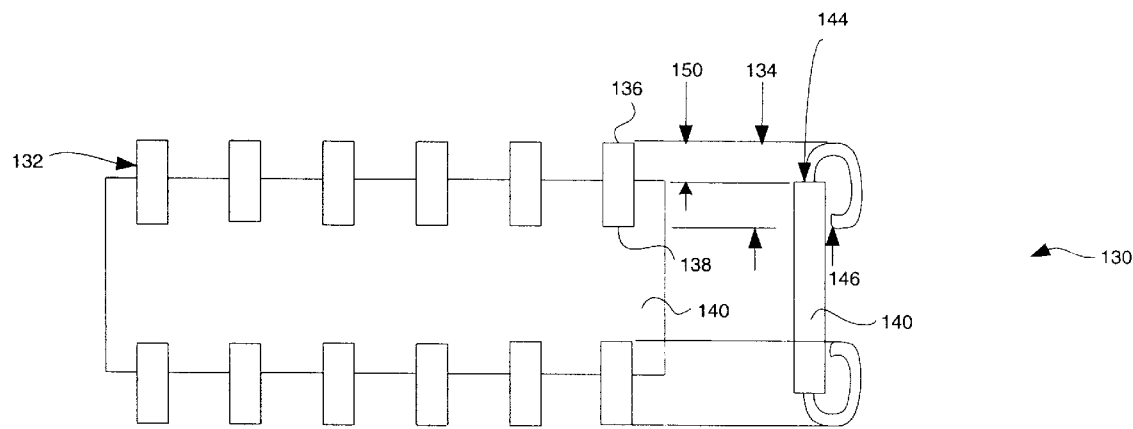
FIG. 1B is a bottom view and a side view of a j-leaded device, not drawn to scale, having leads whose extents can be measured using the invention.
Figure 1A:
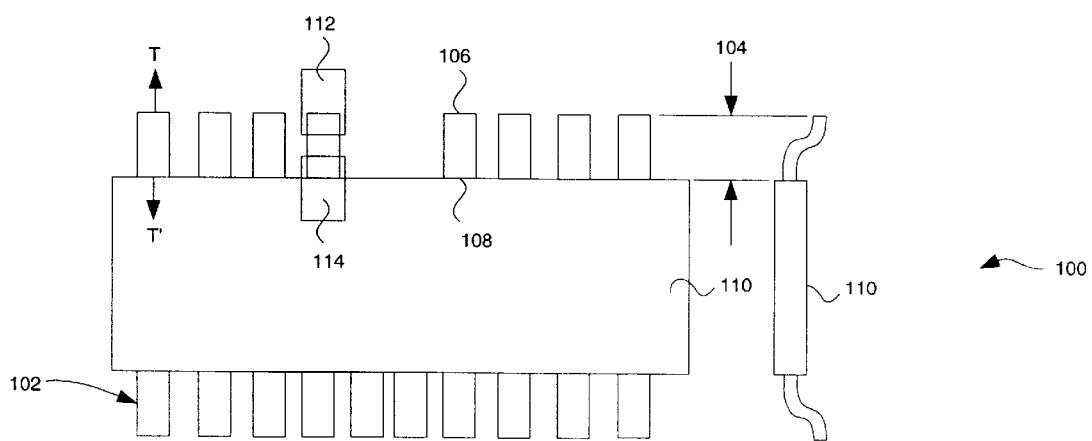
FIG. 1A is a bottom view and a side view of a gullwing-leaded device, not drawn to scale, having leads whose extent can be measured using the invention.
Figure 2:
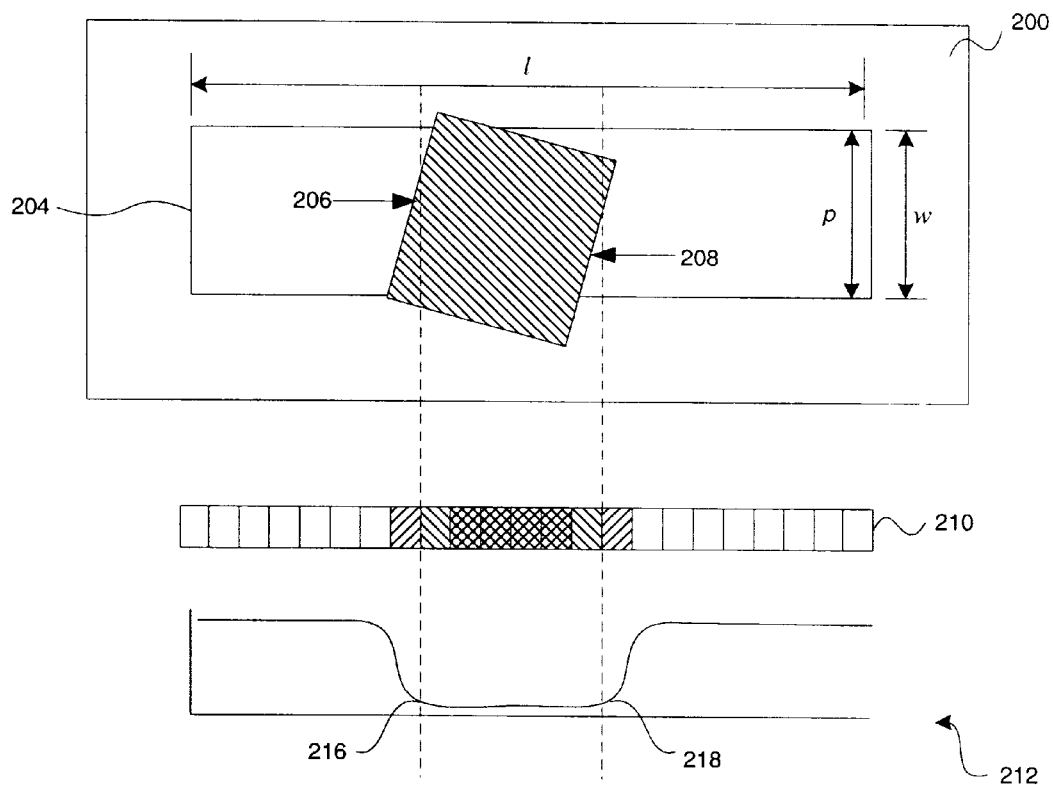
FIG. 2 is an object in an image, a representation of a window of the CALIPER TOOL extending across the object, a one-dimensional image generated from the projection of the pixels within the window, and a grey-level histogram, which is a graphical representation of the one-dimensional image.
Figure 3:
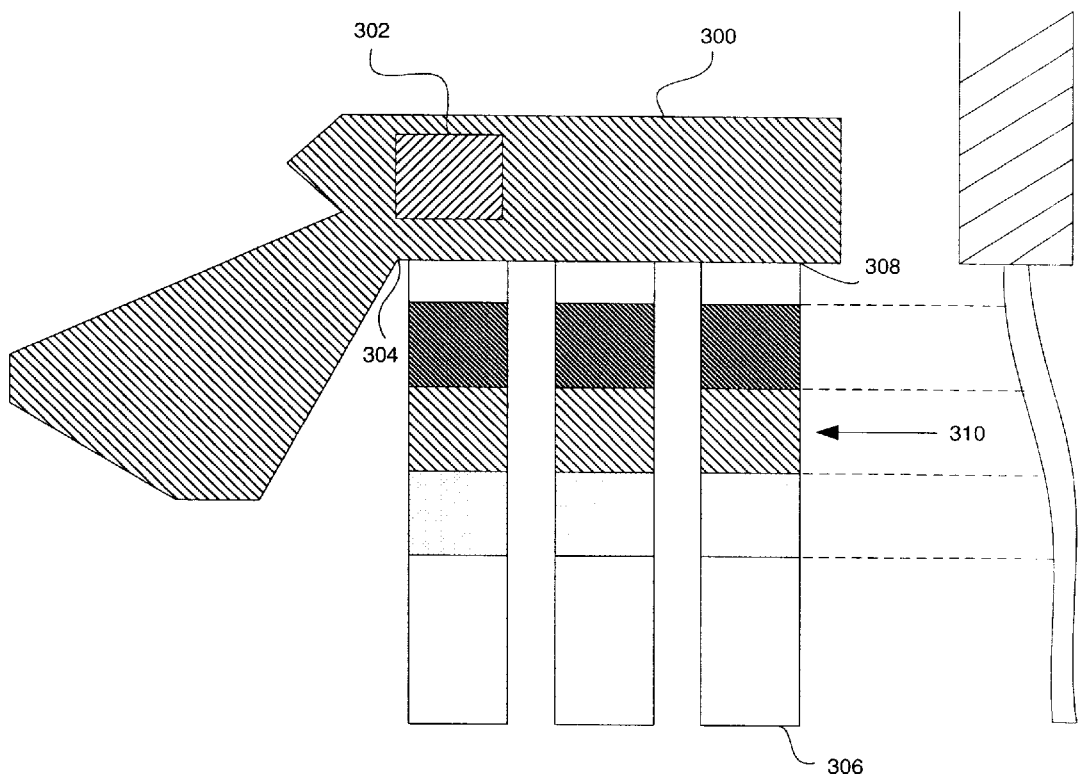
FIG. 3 illustrates a simplified view of the intensities of gullwing leads from a front-lit image of a bottom view of a leaded device, not drawn to scale. A feature on the body of the leaded device and a side view of the leaded device are also shown.
Figure 4A:
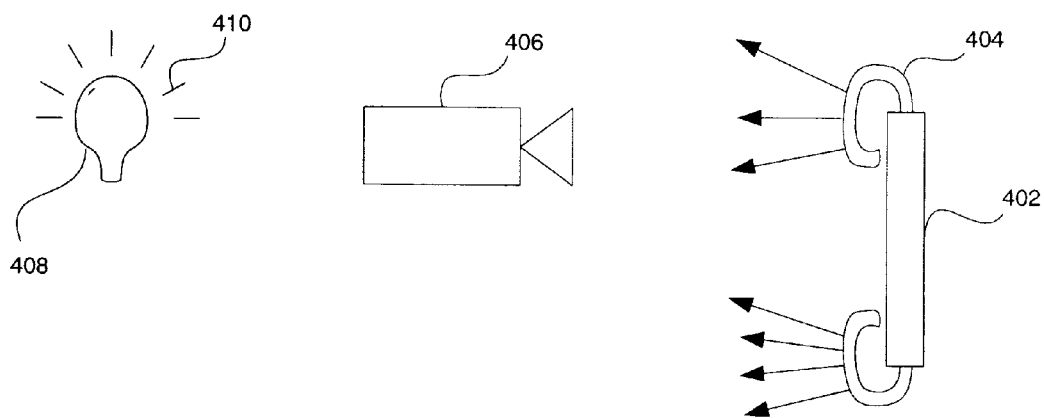
FIG. 4A is a schematic side view of a front-lit j-leaded device.
Figure 4B:
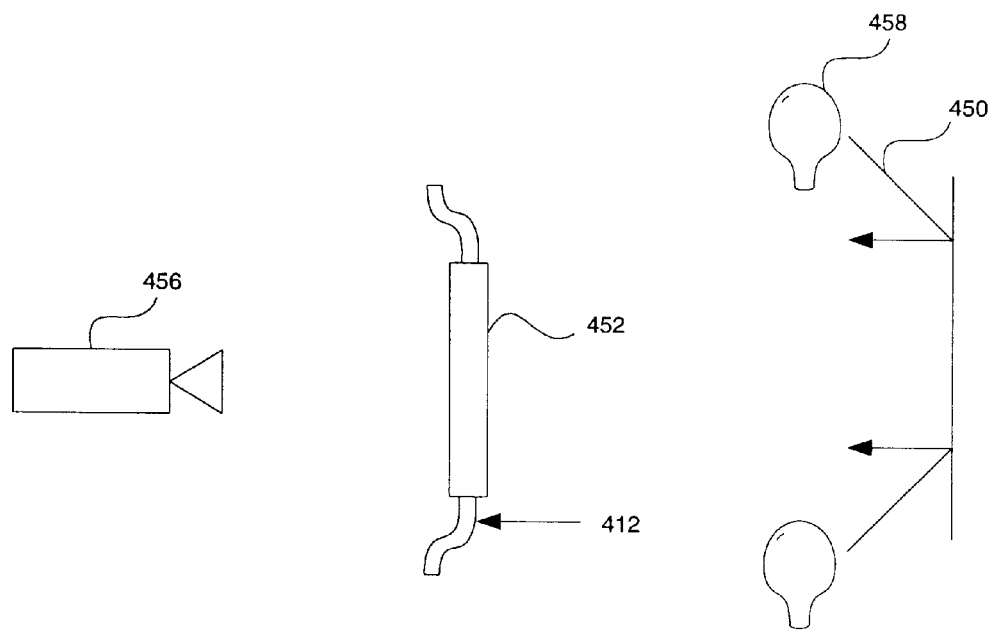
FIG. 4B is a schematic side view of a back-lit leaded gullwing-leaded device.

The methods are particularly useful for measuring the length of leads of a leaded device. Though this is the form of a preferred embodiment, this embodiment should be considered illustrative, not restrictive. In this application, the methods measure the length of the leads in the image. For a gullwing-leaded device 100, the length 104 is the distance between the terminating ends of the leads, the base 108 and the tip 106. For a front-lit j-leaded device 130, the length used by the SMD machine is typically the distance 134 between the lateral extremes 136 and 138 of the j-leads 132 as viewed in an image of the bottom of a j-leaded device 130, as shown in FIG. 1B. In a back-lit j-leaded device 130, the lead length 150 is the distance between the lateral extremes 136 and 144 of the j-leads as viewed in an image of the top of the j-leaded device. Unlike the gullwing-leaded device 100, the terminating ends 144 and 146 of the j-leads are not visible within a front-lit image, and, therefore, are not appropriate end points for measuring lead length.

The methods detect the presence or absence of the leads at positions within a digital image. The presence or absence of the leads is determined by comparing a known reference signature, representative of the relationship of the leads to one another, against instances of a measured signature at varying positions within the image.

The first step of the methods, therefore, is to provide a reference signature (502). Preferably, the reference signature represents both the number of objects within the group and the position of the objects relative to one another. FIGS. 6A–6D illustrate a reference signature 600 for a lead set 602 of a leaded object 604, not drawn to scale.

The reference signature 600 has multiple slots 608. Each of the slots 608 corresponds to the position of an edge, i.e., a representation of one side of a lead 610, within a positional tolerance, t, where t is the width of each of the slots 608. The relative positions of the slots 608 represents the spacing between the leads 636 and the width of the leads 634. The number of slots 608 equals two times the number of the leads 610, i.e., number of the lead sides.

Figures 6A, 6B, 6C, 6D:
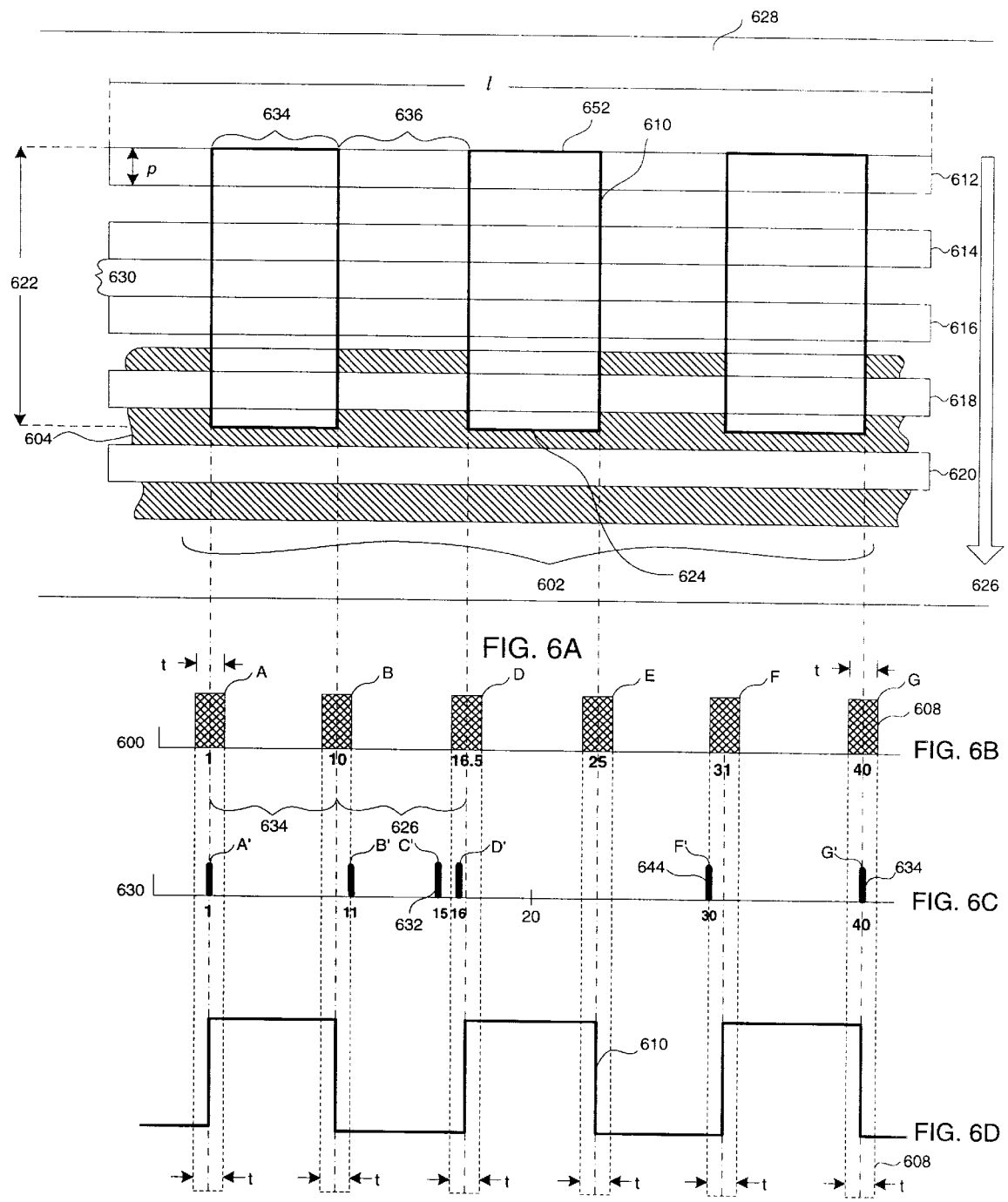
FIG. 6A is a representation of the coarse portion of the method of FIG. 5 applied to a set of leads, not drawn to scale.
FIG. 6B is an example of a reference signature of a portion of FIG. 6A having multiple edges.
FIG. 6C is an example of a measured signature of a portion of FIG. 6A having multiple edges.
FIG. 6D is an example of two leads and the slots and edges associated with the two leads, where the slots are contained within the reference signature of FIG. 6B, not drawn to scale.

When the reference signature 600 is compared to a measured signature 630, illustrated in FIG. 6C, each slot 618 of the reference signature 600 can accept an edge 644 of the measured signature 630. If the position of an edge 644 is within the positional tolerance, t, of a slot 618, the edge 644 "fills" the slot 618 in the reference signature 600, where "fill" can also be expressed as map to, match or other similar terms. An edge "fills" a slot when the lead side in the image is positioned where the reference signature 600 anticipates the lead side should be positioned. For instance, with reference to FIG. 1B, the leeway of a j-lead 132 is typically large because t accommodates the tapering of the width of the lead as it changes from one end 144 to the other end 146.

When the positional tolerance of an edge approaches the width of the edge, the position of the edge and the slot substantially coincide. It is advantageous, however, to have leeway (i.e., positional tolerance) around the expected positions of the edges. The degree of the leeway varies according to each application and each group of objects being measured, provided t is small enough so the slots do not overlap.

The reference signature 600 is generated by positioning a window of the CALIPER TOOL over the leads 602, determining the positions of the edges corresponding to the lead sides, and adding a positional tolerance to each edge position. The window is positioned such that its projection axis p is substantially parallel to, and its length l is substantially perpendicular to, the extent being measured, the length of the leads 622. The orientation of the window amplifies edges along p. The orientation of the window is approximately 90° offset from the prior art position of the window of the CALIPER TOOL described herein before, even though both the prior art and the embodiment is measuring the same extent, the length of the leads 622. The prior art projection amplified the edges of the lead tips 652 and lead bases 624 as opposed to the lead sides amplified by the invention.

After the window is positioned, the method determines the positions of the edges by projecting the pixels within the window to generate a one-dimensional image, which is filtered to enhance the edge information as described herein before. In addition to filtering the edge information within the one-dimensional image, geometric constraints are applied to the edges before the edges are used for the reference signature. Geometric constraints are described in Vision Tools, Chapter 4, CALIPER TOOL, Cognex Corporation, Version 7.4, 1996, pp. 208–231, incorporated herein by reference. Geometric constraints limit the number of edges in the one-dimensional image, and thereby minimize confusion between a side of a lead and noise in an image.

Figure 7:
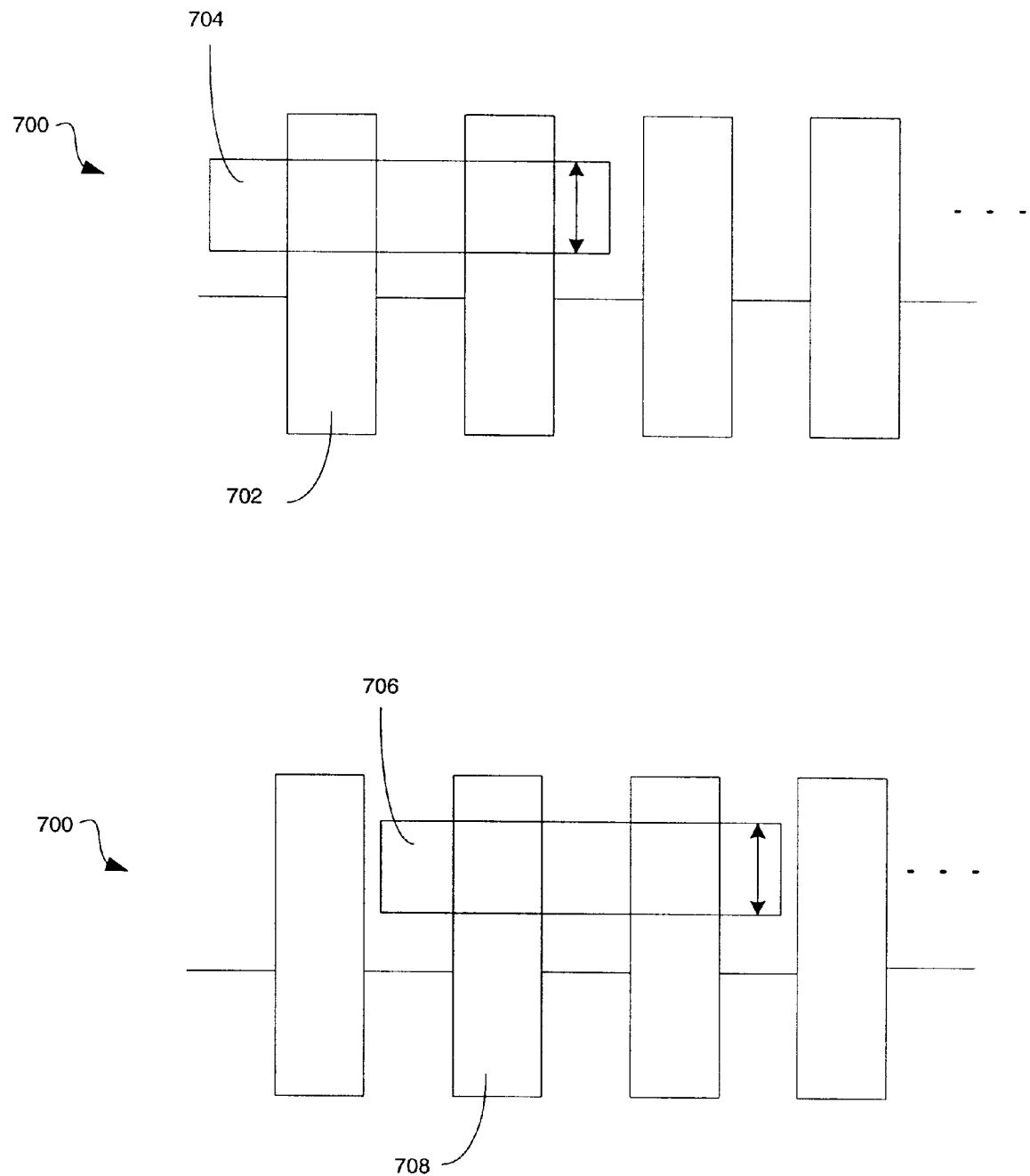
FIG. 7 is a representation of a series of windows laid across only a portion of the leads, not drawn to scale, in a searching pattern from the left-most lead to the right-most lead.

In a preferred embodiment, the method locates pairs of edges representing a single lead, i.e., applies geometric constraint(s), before searching for edges of a subsequent lead. The search pattern minimizes confusion between a side of a lead and noise in an image. The search pattern is illustrated in FIG. 7, not drawn to scale. First, the edge pair of the first lead 702 is located within window 704 before window 706 searches for the edge pair corresponding to the second lead 708. The image 700 is searched from left to right until all edge pairs are located.

An edge pair of a lead contains two edges with opposite polarities; the opposite polarity is a geometric constraint. The geometric constraint can also include spacing of the edges or contrast of the edges as needed. The complexity of the geometric constraint required depends upon each application.

Returning to FIG. 6A, the reference signature 600 can be derived from the edges generated by any window that encloses a portion of the leads, such as window 612, 614, 616, or 618. In one embodiment, the reference signature is derived from the edges of window 612, whose position corresponds with the lead tips 652. The position of the window 612 is given by the methods and apparatuses disclosed in the commonly assigned patent application, Ser. No. 09/203,182 entitled "Methods and Apparatuses for Refining a Geometric Description of an Object Having a Plurality of Extensions", filed concurrently herewith on Nov. 30, 1998 in the names of Albert Montillo, Ivan Bachelder, and Cy Marrion, and incorporated herein by reference, which method overcomes the necessity of the prior art of a general knowledge of the position and orientation of the leads. The window position 612 can also be from operator input or coarsely located using other methods, such as segmenting the image and evaluating a location of the tips.

Alternatively, the reference signature 600 is derived from operator input or generated from another image, such as a featural model or synthetically from geometric data describing the object, for example. The usefulness of an alternatively generated reference signature depends upon the characteristics of the objects being measured and the environmental circumstances, such as lighting conditions, for example.

After the reference signature is provided (502), one embodiment of the method measures instances of a measured signature that represent varying positions within the image. The search pattern for measuring instances of the measured signature described in steps (504)–(518) can vary. If the position of the tips of the leads 652 is known, the image is searched by successively moving the window toward the device body 604, i.e., in the direction of arrow 626. Alternatively, the image is searched from a more central position, such as window 616, both towards and away from the device body 604, such as window 618 and window 614, respectively. A dual direction search is useful when the position of the lead tips 652 is less certain. The search strategy is directed by the application.

The search is started by positioning a window with its projection axis oriented substantially parallel to the lead sides (504). Then, the grey values of the pixels within the window are projected. The contrasts of the edges are measured and thresholded (506). Thresholding discards the weaker contrast edges and reduces the number of edges included in the measured signature. Typically, the discarded edges are small-level noise or light edges on the device body. Optimally, the threshold value retains, within the measured signature, all edges of the lead sides, both weak and strong. A consequence of keeping the threshold low enough to retain the weaker lead side edges is that edges corresponding to strong noise or the background may also remain after thresholding. The comparison step compensates for the extraneous edges as hereinafter described.

Next, the measured signature 630 is compared to the reference signature 600 (508). Again, if the position of an edge 644 in the measured signature 630 is within the positional tolerance, t, of a slot 618 in the reference signature 600, then the edge 644 "fills" the slot 618 in the reference signature 600. For example, the position of a first edge A' of the measured signature 630 is compared to the position of a first slot A of the reference signature, because A' and A are both positioned at 1, edge A' "fills" slot A. The next edge B' of the measured signature 630, located at 11, fits within next slot B of the reference signature 600 having a positional tolerance of t–2, i.e., 9–11, for slot B centered at 10.

The next edge C' 632 of the measured signature 630 located at 15 is noise. Edge C' 632 does not fit within the positional tolerance of t=2 of next slot D of the reference signature 600 centered at 16.5. Therefore, C' 632 is discarded, and the next edge D' of the measured signature 630, located at 16, is examined. The next edge D' "fills" slot D. Edge F' of the measured signature 630, located at 30, does not "fill" slot E, located at 25, so slot E is left empty and slot F is examined. Edge F', locate at 30, "fills" slot F centered at 31 within a positional tolerance of t=2. The process is continued across the measured signature 630.

The measured signature and the reference signature are compared by counting the number of slots of the reference signature that are "filled" by the edges of the measured signature (508). The number of "filled" slots indicates whether the leads are under the window position of the measured signature (510). Specifically, if the number of slots "filled" is greater than the comparison criteria, then that measured signature is still over the lead set (512); thus the leads are still present. The window is incremented (518) to the next position, such as window 616, and the next measured signature is generated until the comparison indicates that the measured signature represents a part of the image off the leads. Thus, indicating the absence of the leads (516), which occurs at window 620 in the example.

The comparison criteria, i.e. the minimum number of slots filled, can be expressed as a percentage, such as 90%, or an absolute number, and its value will depend on the application.

Unlike the reference signature, the measured signature only obtains the contrast and the positions of the edges. The polarity of the edges and other details of the edges are not necessary for some applications. In these applications, the positions of the edges, not their polarity or parings are examined to determine if an edge 644 "fills" a slot 618 in the reference signature 630.

It is recognized by the invention that relaxing the requirement of finding edge pairs within the measured signature provides latitude for noise, while still properly determining the extent of the objects. Noise can be from dirt, uneven lighting, or shadows, for example. The noise, such as C', within the measured signature is ignored and not improperly forced into slots. Instead, the method uses the reference signature containing the knowledge of the presence of a group of objects and the knowledge of the spacing between the objects to alleviate discrepancies caused by noise without altering the accuracy of the measurement of the extent of the group of objects.

At the same time, including both the number and position information in the measured signature along one-dimension allows the method to discern sets of thin parallel lines that typically confuse other software recognition programs.

Alternatively, the measured signature can contain information other than position and number of edges, such as edge pairings, particularly for applications containing difficulties other than noise. The more detailed measured signature can accurately indicate the presence of a group of objects in an image despite various difficulties. For instance, a minor calibration inaccuracy can significantly alter a reference signature generated form a synthetic model. For example, a 0.01% calibration error will place the $100^{th}$ edge of a synthetically generated reference signature off by an entire lead. A measured signature that examines edge pairings using the search pattern described with reference to FIG. 7 can compensate for such a discrepancy and still approximately find the group of objects.

Once the comparison indicates that the measured signature no longer represents the group of objects (516), the position of the last window is used to determine the extent of the group of objects (522). If the position of the tips of the leads 652 is known, the extent is approximately the difference between the tip position and the position of the window of the last measured signature over the leads 618. Alternatively, if the image is searched from a more central position, the extent is approximately the difference between the outer-most window both towards and away from the device body 604 that indicated the leads were present, such as window 618 and window 612. The extent calculation is more precise when windows have smaller widths and when the window position is incremented more finely.

Optionally, the extent is refined further by repeating the process (530) at a finer increment (532) for a smaller segment of the image, being the area between the last two window positions 618 and 620.

Figure 8:
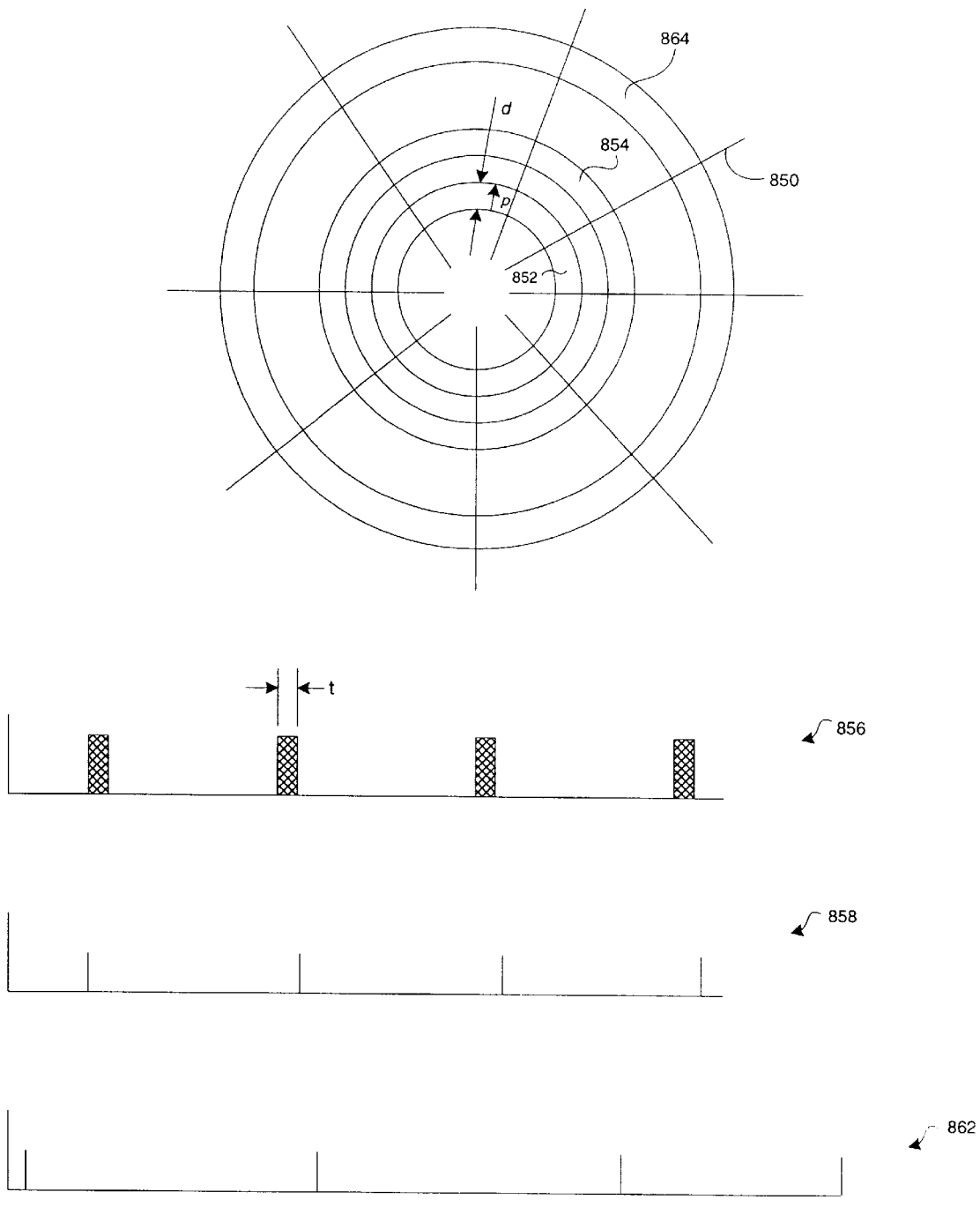
FIG. 8 is an example of a group of objects having non-parallel orientations relative to each other, whose extents can be found using the method of FIG. 5. Also shown are a reference signature and two measured signatures of the group of objects, measured at increasing radial distances from the center of the group of objects.

Optionally, to accommodate groups of objects whose relative positions to one another vary along their extents, the reference signature can be updated (514). Updating the reference signature is particularly useful for measuring objects such spokes 850 on a bicycle wheel as shown in FIG. 8, not drawn to scale. In this example, a circular window 852 is positioned such that the projection axis, p, is substantially parallel to the radius of the wheel. The image within the circular window is projected to produce a reference signature, such as measured signature 856. The window is then incremented radially outward to window position 854, and measured signature 858 is produced.

The positional tolerance, t, of the slots, in this example, is a function of length of the projection, d, and the width of the spokes 850, where, for instance, t=$2\pi$ d+(edge width of a spoke that is x mm thick). However, the reference signature 856 generated from window 852 will produce a useless result when compared in x against the measured signature 862 of window 864. To accommodate the change, after the measurement of the measured signature, the reference signature is updated (514). The previous measured signature 858 becomes the updated reference signature 858, and the next measured signature 862 is compared against the updated reference signature 858 and not against the original reference signature 856. This process allows more variation in position of objects along the extents of the object; the radial example is an extreme case. In contrast, if only minor variations are permitted, such as in low tolerance product specifications, then the reference signature would not be modified at each increment.

Figure 9:
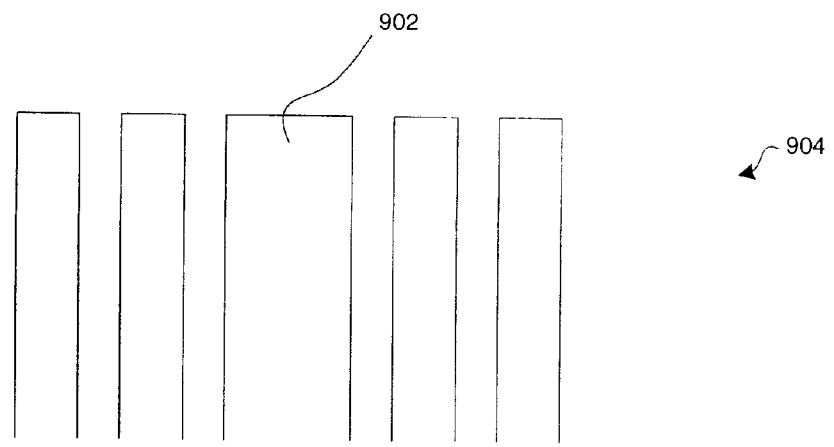
FIG. 9 is an example of a group of objects and a corresponding reference signature that can be used in the method of FIG. 5 and that contains information on the number, spacing and magnitude of the group of objects.
Figure 9:
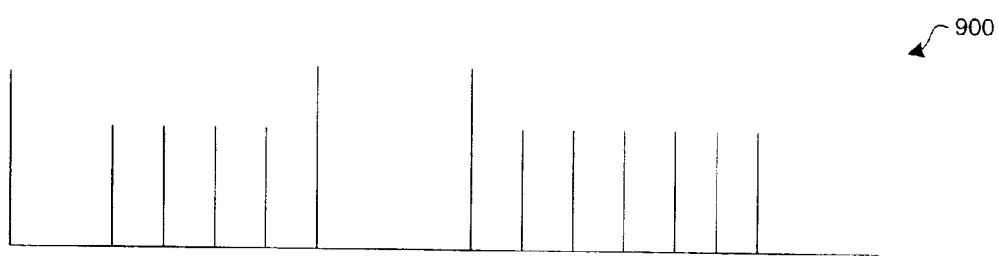

In some applications, it is advantageous to have the reference signature represent other characteristics of the image in addition to relative position and number of objects in a group, such as magnitude or polarity of the edges. An example of a reference signature 900 that also indicates magnitude is shown in FIG. 9, not drawn to scale. For instance, a wider object 902 within a group of objects 904 may have an edge with a stronger magnitude and produce the reference signature 900.

It should also be apparent that the reference signature can be comprised of characteristics other than positions of edges, such as intensity values, for example.

Figure 10:
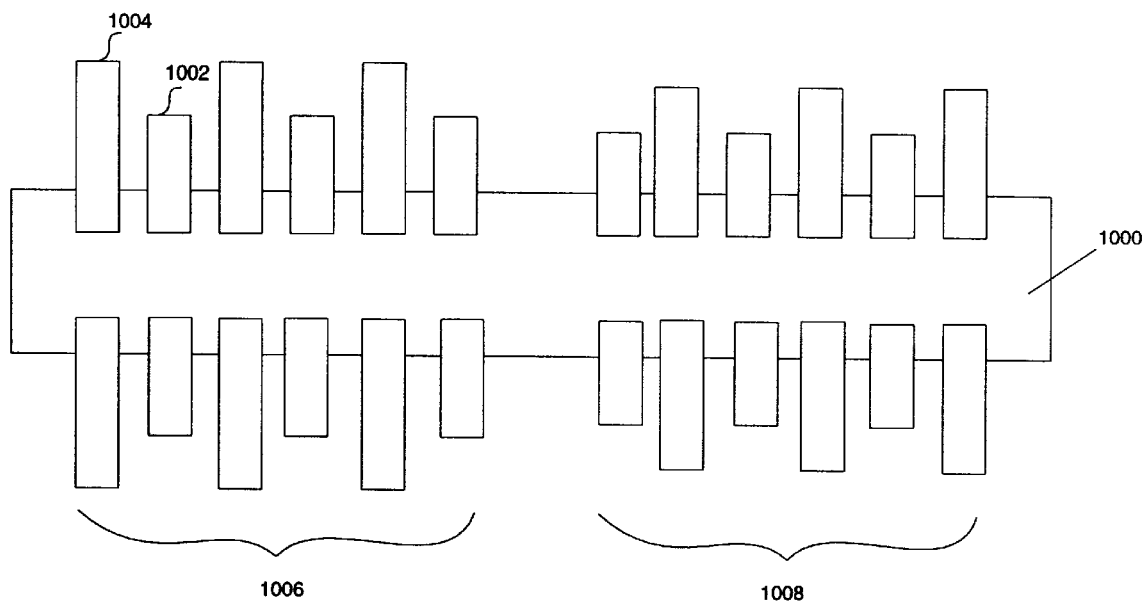
FIG. 10 is an example of other groups of objects having parallel orientations relative to each other whose extents can be found using the method of FIG. 5.
Figure 10:
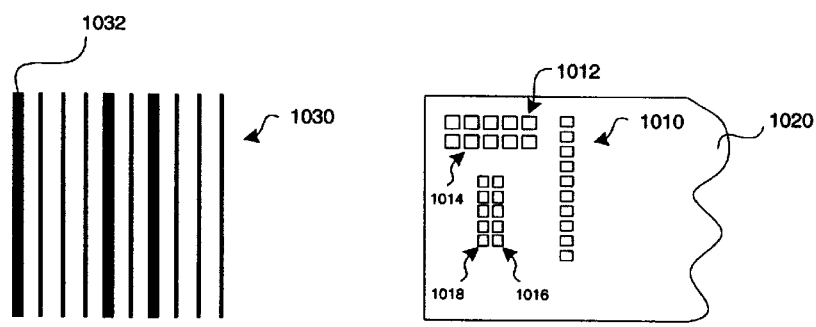
Figure 10:
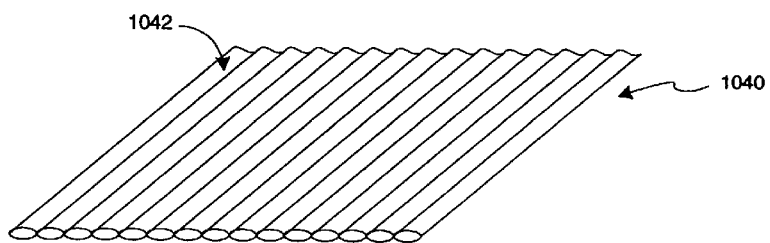

FIG. 10 illustrates other objects having parallel orientations relative to each other whose extents can be found using the methods of the invention. The extent of either of the group of leads 1002 or 1004 can be determined on the leaded device 1000. Typically in SMD applications, the split-lead sets 1006 and 1008 are evaluated separately. However, the invention eliminates the need for separate evaluation because the entire side 1006 and 1008 is represented by one reference signature having two groups of spaced slots, one for each lead set 1006 and 1008. Other electronic devices besides leaded devices can be evaluated by the invention, for example, such as chips, programmable logic controllers, ball grid array devices, and odd form devices, such as connectors, heat shields, for example. For instance, the extent of any group of pads 1010–1018 on the PCB 1020 can be determined using the methods of the invention.

The methods of the invention can determine extents of groups of objects other than electrical devices, such as the extent of the two-dimensional bar code 1030 or the extent of the grooves 1042 in corrugated cardboard 1040. The method can find the length of the grooves 1042 or lines 1032. The method can also detect a break, bend or curve in the grooves 1042 or lines 1032. Deviation between a measured signature and a reference signature of the cardboard 1040 owing to a break, bend or curve may indicate a problem in the production line from crushing the cardboard, for example. The comparison criterion indicating the break, bend or curve would be much closer to 100% then the comparison criteria tailored to previous lead set applications. Deviation between the reference signature and a measured signature of a bar code may indicate a defective screen printer.

Figure 11:
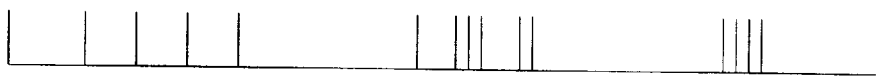
FIG. 11 is an example of a reference signature of a randomly spaced group of objects that can be used in the method of FIG. 5.

FIG. 11 illustrates signatures of randomly positioned objects whose extent can be determined using the method of this invention.

Figure 12:
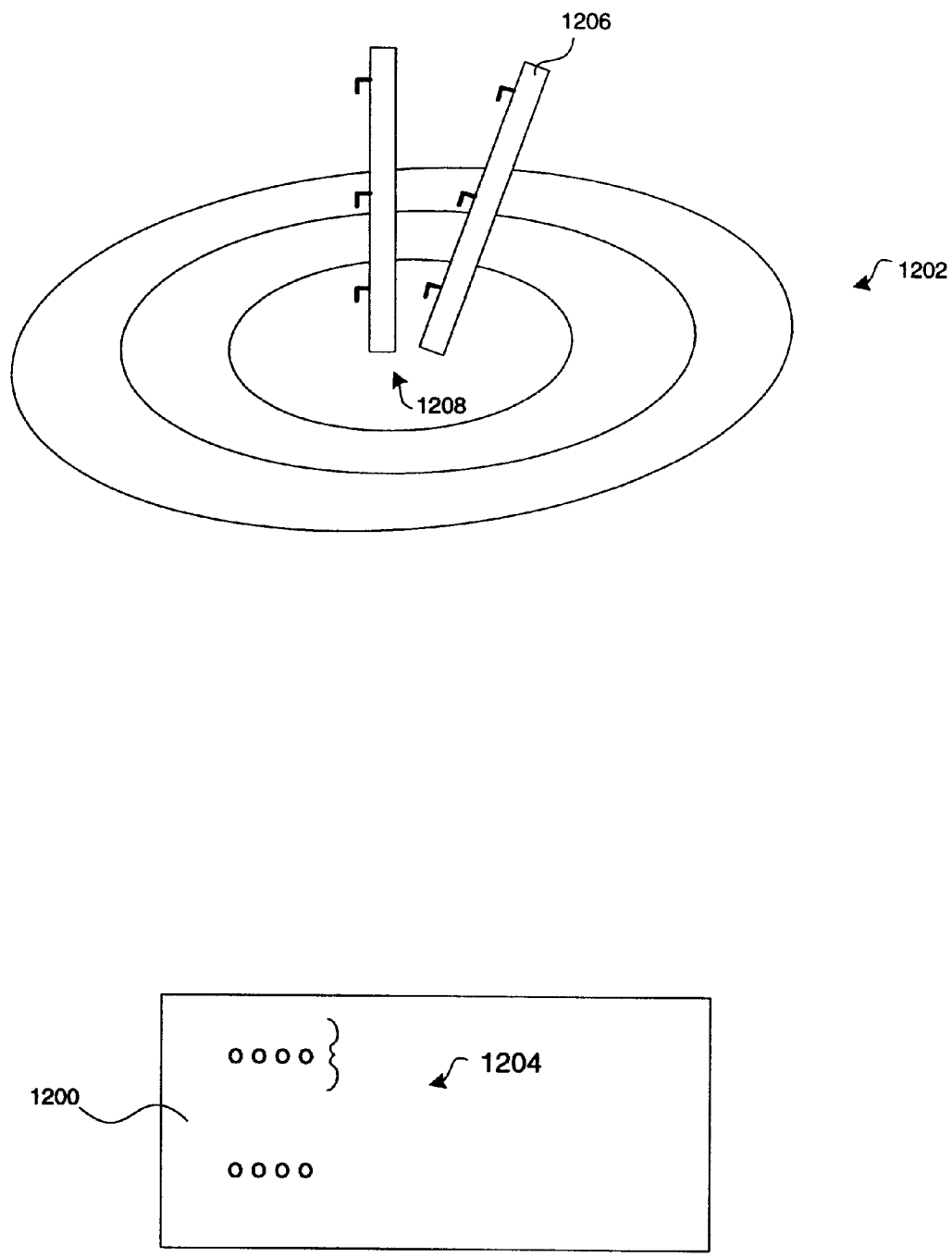
FIG. 12 is an example of other groups of objects having non-parallel orientations relative to each other whose extents can be found using the method of FIG. 5.

FIG. 12 contains examples of other objects having non-parallel orientations relative to each other whose extents can be found using the methods of the invention. The image of solder bumps 1200 is an example of an application wherein the reference signature could solely represent the number of solder bumps along each row 1204.

The method can measure the angular extent of concentric features 1202. Radial windows of the CALIPER TOOL 1206 can be applied and their position incremented or decremented along the angular direction, while the endpoint 1208 remains substantially constant. Alternatively, the concentric features 1202 are re-mapped by performing a polar transformation, as known in the art (the theta dimension becomes the length dimension). The windows of the CALIPER TOOL are then applied substantially normal to the length dimension.

Although the preferred implementation uses the CALIPER TOOL to find the signatures, it should be apparent that projecting an area within a two-dimensional window into a one-dimensional signal, i.e., summing the pixel intensities of an area, without more will provide enough information to create a signature. Further, applying an edge operator, such as Sobel, across a portion of the image will also provide the required information. Even a one-dimensional scan may provide the required information.

Although the window is positioned such that its projection axis, p, is as close as possible substantially parallel to the length of the objects, the degree p can be of offset from parallel depends upon each application, each point within the method, and varies widely as is known in the art.

Other modifications and implementations will occur to those skilled in the art without departing from the spirit and the scope of the invention as claimed. Accordingly, the above description is not intended to limit the invention except as indicated in the following claims.

What is claimed is:

1. A method for measuring an extent of a group of objects within a digital image, the method comprising:
   providing a reference signature of the group of objects representative of at least one arrangement of the objects relative to one another comprising:
      placing a window extending across at least a portion of the group of objects and having a projection axis substantially parallel to the extent of the group of objects at the reference position;
      detecting edges by projecting the part of the image within the window along the projection axis; and
      measuring a reference signature using the edges;
   placing a window extending across at least a portion of the group of objects and having a projection axis substantially parallel to the extent of the group of objects;
   measuring a measured signature at a plurality of positions of the window along a direction of the extent by projecting the part of the image within the window along the projection axis;
   comparing the reference signature to the measured signature at each of the plurality of positions;
   recording at least one window position at which the measured signature differs by a predetermined comparison criteria from the reference signature; and
   calculating the extent of the group of objects using the at least one window position.

2. A method for measuring an extent of a group of objects within a digital image, the method comprising:
   providing a reference signature of the group of objects representative of at least one arrangement of the objects relative to one another by placing a window extending across at least a portion of the group of objects and having a projection axis substantially parallel to the extent of the group of objects at the reference position and measuring a reference signature by projecting the part of the image within the window along the projection axis;
   placing a window extending across at least a portion of the group of objects and having a projection axis substantially parallel to the extent of the group of objects;
   measuring a measured signature at a plurality of positions of the window along a direction of the extent by projecting the part of the image within the window along the projection axis;
   comparing the reference signature to the measured signature at each of the plurality of positions;
   recording at least one window position at which the measured signature differs by a predetermined comparison criteria from the reference signature; and
   calculating the difference between the reference window position of the reference signature and the at least one window position of the measured signature to provide the extent of the group of objects.

3. A method for measuring an extent of a group of objects within a digital image, the method comprising:
   providing a reference signature of the group of objects representative of at least one arrangement of the objects relative to one another;
   placing a window extending across at least a portion of the group of objects and having a projection axis substantially parallel to the extent of the group of objects;
   measuring a measured signature of the window at a plurality of positions in opposite directions, both the opposite directions being along a direction of the extent, by projecting the part of the image within the window along the projection axis;
   comparing the reference signature to the measured signature at each of the plurality of positions;
   recording at least one window position at which the measured signature differs by a predetermined comparison criteria from the reference signature; and
   calculating the extent of the group of objects using the at least one window position.

4. The method of claim 3, wherein calculating the extent of the group of objects using the at least one window position involves,
   calculating the extent as the difference between the at least one window positions of each direction.

5. A method for measuring an extent of a group of objects within a digital image, the method comprising:
   providing a reference signature of the group of objects representative of at least one arrangement of the objects relative to one another, the reference signature having slots;
   placing a window extending across at least a portion of the group of objects and having a projection axis substantially parallel to the extent of the group of objects;
   measuring a measured signature at a plurality of positions of the window along a direction of the extent by projecting the part of the image within the window along the projection axis, the measured signature having edges;
   comparing the reference signature to the measured signature at each of the plurality of positions by matching a portion of the slots of the reference signature with similarly arranged edges of the measured signature, and disregarding any not similarly arranged edges in the measured signature;
   recording at least one window position at which the measured signature differs by a predetermined comparison criteria from the reference signature;
   calculating the extent of the group of objects using the at least one window position.

6. The method of claim 5, wherein a number of edges in the measured signature exceeds a number of sides of the group of objects.

7. The method of claim 5, wherein the edges of the measured signature have contrast values and position.

8. The method of claim 2, wherein the objects are leads on a leaded device.

9. A method for measuring an extent of a group of objects within a digital image, the method comprising:
   providing a reference signature of the group of objects representative of at least a number of the objects in the digital image, the reference signature having slots;
   placing a window extending across at least a portion of the group of objects and having a projection axis substantially parallel to the extent of the group of objects;
   measuring a measured signature at a plurality of positions of the window along a direction of the extent by projecting the part of the image within the window along the projection axis, the measured signature having edges;
   comparing the reference signature to the measured signature at each of the plurality of positions comprising matching a portion of the slots of the reference signature with similarly arranged edges of the measured signature and disregarding any not similarly arranged edges in the measured signature;

recording at least one window position at which the measured signature differs by a predetermined comparison criteria from the reference signature; and calculating the extent of the group of objects using the at least one window position.

10. A method for measuring an extent of a group of objects within a digital image, the method comprising:

providing a reference signature of the group of objects representative of at least a number of the objects in the digital image;

placing a window extending across at least a portion of the group of objects and having a projection axis substantially parallel to the extent of the group of objects;

measuring a measured signature at a plurality of positions of the window along a direction of the extent by projecting the part of the image within the window along the projection axis;

comparing the reference signature to the measured signature at each of the plurality of positions;

recording at least one window position at which the measured signature differs by a predetermined comparison criteria from the reference signature; and calculating the extent of the group of objects using the at least one window position by returning the extent of the group of objects as the difference between two window positions at which the measured signature differs by a predetermined comparison criteria from the reference signature.

11. An apparatus for measuring an extent of a group of objects within a digital image, the apparatus comprising:

a reference signature of the group of objects representative of the arrangement of the objects relative to one another in the image, the reference signature having slots;

window means having a projection axis positioned substantially parallel to the extent of the group of objects and extending across at least a portion of the group of objects;

measuring means for measuring a measured signature at a plurality of positions of the window means along the direction of the extent by projecting the part of the image within the window means along the projection axis, the measured signature having edges;

comparing means for comparing the reference signature to the measured signature at each of the plurality of positions, the comparing means comprising a matching means for matching a portion of the slots of the reference signature with similarly arranged edges of the measured signature and for disregarding any not similarly positioned edges in the measured signature;

recording at least one window means position at which the measured signature differs by a predetermined comparison criteria from the reference signature; and calculating means for calculating the extent of the group of objects using the at least one window means position.

* * * * *